United States Patent
Doke et al.

(10) Patent No.: US 11,645,596 B2
(45) Date of Patent: May 9, 2023

(54) METHOD AND SYSTEM FOR PROOF OF WORK (POW) BASED PROTECTION OF RESOURCES

(71) Applicant: Tata Consultancy Services Limited, Mumbai (IN)

(72) Inventors: Pankaj Doke, Thane (IN); Karan Bhavsar, Thane (IN); Sujit Shinde, Thane (IN); Sanjay Kimbahune, Thane (IN); Manash Paul, Thane (IN); Srinivasu Pappula, Hyderabad (IN); Sylvan Lobo, Thane (IN); Akhilesh Srivastava, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/449,841

(22) Filed: Oct. 4, 2021

(65) Prior Publication Data
US 2022/0351108 A1 Nov. 3, 2022

(30) Foreign Application Priority Data
Mar. 25, 2021 (IN) .............................. 202121013170

(51) Int. Cl.
G06Q 10/06 (2023.01)
G06Q 10/0631 (2023.01)
(52) U.S. Cl.
CPC .............................. *G06Q 10/06313* (2013.01)
(58) Field of Classification Search
None
See application file for complete search history.

(56) References Cited

U.S. PATENT DOCUMENTS

| 7,600,255 | B1 | 10/2009 | Baugher |
| 8,370,340 | B1 | 2/2013 | Yu et al. |
| 8,635,290 | B2 | 1/2014 | Ellanti et al. |
| 9,226,159 | B1 | 12/2015 | Cao et al. |

(Continued)

OTHER PUBLICATIONS

Palomar et al. (Hindering false event dissemination in VANETs with proof-of-work mechanisms, Transportation Research Part C: Emerging Technologies, vol. 23, pp. 85-97, Dec. 14, 2010).*

(Continued)

*Primary Examiner* — Matthew D Henry
(74) *Attorney, Agent, or Firm* — Finnegan, Henderson, Farabow, Garrett & Dunner LLP

(57) ABSTRACT

State-of-the-art techniques hardly attempt to address controlled resource access problem in context of Basic Emergent Users (BEUs). Embodiments of the present disclosure provide a method and system for Proof of Work (POW) based protection of resources. The method includes using the POW for work done by BEUs in physical world and mapping it to digital world to generate crypto currency in terms of credit score, wherein an end user is eligible or authorized to use a resource of an entity to get a desired service if accumulated credit score is above a credit threshold. Gaining points to improve the credit score is challenging as it is based on percentage of compliance achieved by the BEU through actual work in accordance with a compliance protocol. Further, the method includes authenticating the authorized user based on a set of questions with increasing difficulty, derived based on a culture graph.

7 Claims, 8 Drawing Sheets

(56) References Cited

U.S. PATENT DOCUMENTS

| | | | |
|---|---|---|---|
| 9,253,198 | B2 | 2/2016 | Hughes, Jr. et al. |
| 9,621,563 | B2 | 4/2017 | Arunkumar et al. |
| 2002/0120597 | A1* | 8/2002 | Bae .................. G06F 9/542 |
| 2010/0030712 | A1* | 2/2010 | Passovoy ............ G06N 5/04 706/11 |
| 2014/0189799 | A1* | 7/2014 | Lu .................. H04L 63/102 726/4 |
| 2015/0256662 | A1 | 9/2015 | Shapiro et al. |
| 2020/0387594 | A1* | 12/2020 | Sandstrom ........... G06F 21/36 |

OTHER PUBLICATIONS

Yusuf Albayram et al., "Designing challenge questions for location-based authentication systems: a real-life study," Human-centric Computing and Information, Jun. 2015. Springer, https://link.springer.com/content/pdf/10.1186/s13673-015-0032-3.pdf.

Huahong Tu et al, "SoK: Everyone Hates Robocalls: A Survey of Techniques Against Telephone Spam," Symposium on Security and Privacy (SP), May 2016, IEEE, https://ieeexplore.ieee.org/stamp/stamp.jsp?tp=&arnumber=7546510.

Constantinos S. Hilas et al., "User profiling for fraud detection in telecommunication networks Title of the item: Symposium on Security and Privacy (SP)," Jan. 2005, Research Gate, http://citeseerx.ist.psu.edu/viewdoc/download?doi=10.1.1.569.4142&rep=rep1&type=pdf.

* cited by examiner

300 ⟶

┌─────────────────────────────────────────────┐
│ comparing the directed graph of the CP with the WP to │
│ identify a delta work difference, wherein if the delta │
│ difference is zero the request generator is compliant with the │ — 302
│ WP and obtains a full value of the credit score. for the WP │
│ executed, and if the delta difference is non-zero the request │
│ generator is non-compliant with the WP │
└─────────────────────────────────────────────┘
                       ↓
┌─────────────────────────────────────────────┐
│ computing a partial value of the credit score. for the CP
executed, representing percentage of compliance achieved by
the request generator, if the delta difference is non-zero,
wherein the steps of computing the credit score comprises:
a) identifying a set of CP nodes among the plurality of nodes
of the CP traversed by the request generator while executing
the CP;
b) computing a Levenshtein distance between i) the set of CP
nodes with ii) a set of WP nodes among the plurality of nodes   — 304
of the WP, that correspond to the set of CP nodes, wherein
Levenshtein distance is indicative of deviation of the CP
form the WP;
c) computing a compliance score by subtracting the
Levenshtein distance from a predefined quantum of time
which is based on context of economic culture associated
with type of work identified in the CP and the WP, wherein
the compliance score decreases with increase in deviation of
the CP from the WP; and
d) performing one of i) averaging and ii) summation of a
plurality of compliance scores of the request generator for a
predefined time span to generate the credit score for the
request generator │
└─────────────────────────────────────────────┘

FIG. 3A

METHOD AND SYSTEM FOR PROOF OF WORK (POW) BASED PROTECTION OF RESOURCES

PRIORITY CLAIM

This US patent application claims priority under 35 U.S.C. § 119 to Indian complete application no. 202121013170, filed on 25 Mar. 2021. The entire contents of the aforementioned application are incorporated herein by reference.

TECHNICAL FIELD

The embodiments herein generally relate to resource management and, more particularly, to a method and system for Proof of Work (POW) based protection of resources.

BACKGROUND

With customer centric approaches, entities such as service providers offer many free services, wherein resource of the entity is used by the customer/consumer for free. Even though such approaches enhance user experience, it adds cost to the entity as practically the entity pays for the resource usage of its consumers. Thus, it is critical that such free resources are effectively utilized by a true consumer (registered user-non adversary) so that the entity gets true returns for the free services it provides and is intelligently able to identify and block fake consumers or attackers or raise the barriers for such attacks or misuse of resources. Such fake consumers or attackers drain the resources adding to the cost of the service provider or organization and affects the service capability of the company.

Authorization check and multi-level authentication based system are standard existing approaches to provide controlled access, which utilize login IDs, CAPTCHA, passwords, and predefined Question Answer to verify authenticity of each user who is requesting access to the services. However, such mechanisms are practically not useful when end user is Basic Emergent Users (BEUs), who is having very minimal knowledge of technology and self-capability. To enhance user experience, access to any resource for such BEUs has to be hassle free, while still enabling the entity to implement controlled access and apportioning of resources. Further, specifically for free services offered by the entity, it is not advisable that user experiences too many checks during the access attempt, and the checks if any should be in consideration with the end user, who is a BEU.

SUMMARY

Embodiments of the present disclosure present technological improvements as solutions to one or more of the above-mentioned technical problems recognized by the inventors in conventional systems.

For example, in one embodiment, a method for Proof of Work (POW) based protection of resources is provided. The method includes receiving a request from a request generator for resource usage related to a service provided by an entity to Basic Emergent Users (BEUs), wherein the BEUs are registered with the entity for the service. Further the method includes recording a source ID indicative of origin of the request. Further the method includes initiating an authorization process to authorize the request generator as a registered BEU, wherein the request generator is classified as an authorized request generator if a credit score associated the source ID is above a credit threshold. The credit score for each of a plurality of source IDs associated with a plurality of request generators is precomputed and updated at a predefined frequency based on a protocol compliance function that compares a) a Compliance Protocol (CP) executed by the request generator with b) a Work Protocol (WP) that is set by the entity for the request generator. Each of the WP and the CP is a directed graph comprising a) a plurality of nodes with each node associated with a predefined function, and b) a plurality of edges connecting the plurality of nodes to form a plurality of sequences of nodes with each of the plurality of sequences representing a unique execution flow of one or more predefined functions.

Furthermore, the method includes authenticating the authorized request generator as a valid BEU if the authorized request generator provides a correct response to each question among a set of questions, wherein the set of question are generated dynamically in a sequence based on a culture graph, wherein toughness level of each question generated increases to exponentially increase a usability function associated with the response provided for each question. The usability function refers to challenge faced by any end user in answering successive questions.

Furthermore, the method includes granting access to the valid BEU to proceed with the resource usage, wherein the credit score of the valid BEU is deducted in accordance with a volume of the resource usage.

In another aspect, a system for Proof of Work (POW) based protection of resources is provided. The system comprises a memory storing instructions; one or more Input/Output (I/O) interfaces; and one or more hardware processors coupled to the memory via the one or more I/O interfaces, wherein the one or more hardware processors are configured by the instructions to receive a request from a request generator for resource usage related to a service provided by an entity to Basic Emergent Users (BEUs), wherein the BEUs are registered with the entity for the service.

Further the one or more hardware processors are configured to record a source ID indicative of origin of the request. Further the method includes initiating an authorization process to authorize the request generator as a registered BEU, wherein the request generator is classified as an authorized request generator if a credit score associated the source ID is above a credit threshold. The credit score for each of a plurality of source IDs associated with a plurality of request generators is precomputed and updated at a predefined frequency based on a protocol compliance function that compares a) a Compliance Protocol (CP) executed by the request generator with b) a Work Protocol (WP) that is set by the entity for the request generator. Each of the WP and the CP is a directed graph comprising a) a plurality of nodes with each node associated with a predefined function, and b) a plurality of edges connecting the plurality of nodes to form a plurality of sequences of nodes with each of the plurality of sequences representing a unique execution flow of one or more predefined functions.

Further the one or more hardware processors are configured to authenticate the authorized request generator as a valid BEU if the authorized request generator provides a correct response to each question among a set of questions, wherein the set of question are generated dynamically in a sequence based on a culture graph, wherein toughness level of each question generated increases to exponentially increase a usability function associated with the response provided for each question. The usability function is measured in terms of toughness level of each question faced by any end user in answering successive questions Further the one or more hardware processors are configured to grant access to the valid BEU to proceed with the resource usage, wherein the credit score of the valid BEU is deducted in accordance with a volume of the resource usage.

In yet another aspect, there are provided one or more non-transitory machine-readable information storage mediums comprising one or more instructions, which when executed by one or more hardware processors causes a method for Proof of Work (POW) based protection of resources.

The method includes receiving a request from a request generator for resource usage related to a service provided by an entity to BEUs, wherein the BEUs are registered with the entity for the service.

Further the method includes recording a source ID indicative of origin of the request. Further the method includes initiating an authorization process to authorize the request generator as a registered BEU, wherein the request generator is classified as an authorized request generator if a credit score associated the source ID is above a credit threshold. The credit score for each of a plurality of source IDs associated with a plurality of request generators is precomputed and updated at a predefined frequency based a protocol compliance function that compares a) a Compliance Protocol (CP) executed by the request generator with b) a Work Protocol (WP) that is set by the entity for the request generator. Each of the WP and the CP is a directed graph comprising a) a plurality of nodes with each node associated with a predefined function, and b) a plurality of edges connecting the plurality of nodes to form a plurality of sequences of nodes with each of the plurality of sequences representing a unique execution flow of one or more predefined functions.

Furthermore, the method includes authenticating the authorized request generator as a valid BEU if the authorized request generator provides correct responses to each question among a set of questions, wherein the set of question are generated dynamically in a sequence based on a culture graph, wherein toughness level of each question generated increases to exponentially increase a usability function associated with response provided for each question. The usability function is measured in terms of toughness level of each question faced by any end user in answering successive questions.

Furthermore, the method includes granting access to the valid BEU to proceed with the resource usage, wherein the credit score of the valid BEU is deducted in accordance with volume of the resource usage.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A is a flow diagram illustrating a method for credit score computation for Proof of Work (POW) based protection of resources, using the system of FIG. 1, in accordance with some embodiments of the present disclosure.

Figure 1:
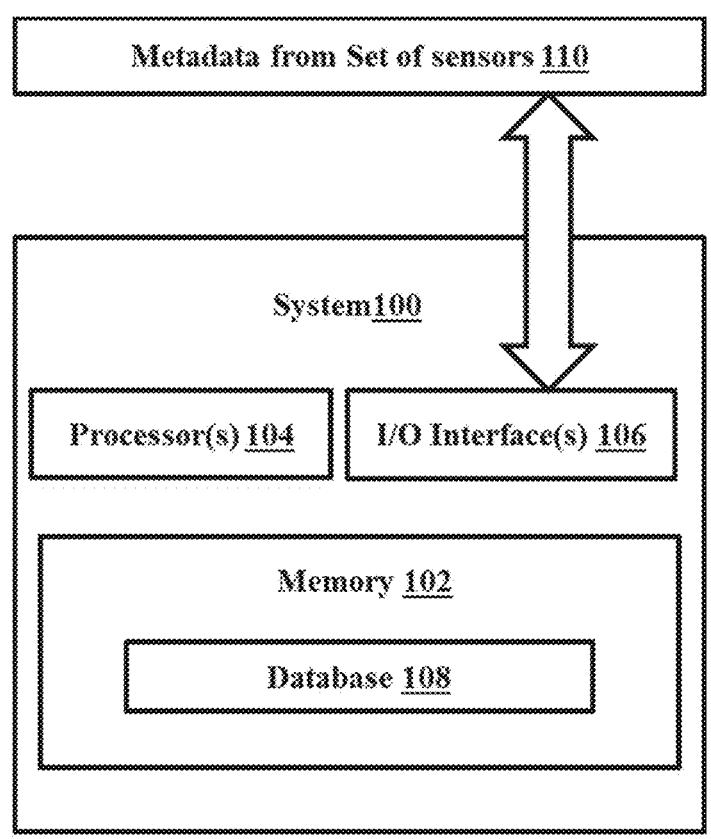
FIG. 1 is a functional block diagram of a system for Proof of Work (POW) based protection of resources, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In a customer centric approach entities such as organizations and companies provide various services to end users, wherein these services can be availed by the end user via free usage of resources offered by the entity. A typical example of such service is a toll free communication to provide consultation to the end user, where the 'consultation' is a service while the 'resource' is the 'toll free communication network' of the entity. As mentioned earlier, even though the resource usage may be free of cost to the customer, but the actual cost is bore by the entity. Thus, controlled access of the resource or protection of resource usage is necessary. However, when the end users are Basic Emergent Users (BEUs) having very minimal knowledge of technology usage, maximum part of the controlled access mechanism is expected to be performed in background with minimal checks experienced by the BEU during actual usage of resources. Further, the approach used for authorizing or authenticating the end user should be such that the BEU is not burdened with need to understand the technology such as need to understand CAPTCHA, remembering and entering user or login IDs and passwords and the like.

Embodiments of the present disclosure provide a method and system for Proof of Work (POW) based protection of resources. The method includes using the POW for work done by BEUs in physical world and mapping it to digital world to generate crypto currency in terms of credit score. A BEU, who is an end user, is eligible or authorized to use a resource of an entity to get a desired service only if accumulated credit score is above a credit threshold. The method makes gaining points to improve the credit score challenging, by relying on percentage of compliance achieved by the BEU through actual work in accordance with a Work Protocol (WP) set by the entity. Further, the method adds another level of check by authenticating the authorized user prior to allowing resource usage. The authentication is based on a set of questions posed to the end user with increasing difficulty. The set of question are derived based on a culture graph generated for BEUs registered with the entity.

Thus, the method enables increasing a cost function, which refers to the challenge or difficulty any end user faces in improving the credit score to be eligible for reuse of the resource, if the end user is non-compliant with respect to the WP. The cost function is measured in terms of decrease in credit score for every failed attempt. Similarly, the method enables increasing a usability function, which refers to challenge or difficulty faced by end user (spam/fake user) in answering successive questions with increased level of toughness and is measured in terms of toughness level of each question. Thus, with the usability function and the cost function, the method discourages any repeated attempts by invalid or fake end users. Further, with usage of resource by the authorized and authenticated user, equivalent credit score is deducted from the user account. Thus, credit score deduction enables keeping a check on unnecessary, or over usage of the free resource offered to the BEU or end user.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1 is a functional block diagram of a system for Proof of Work (POW) based protection of resources, in accordance with some embodiments of the present disclosure.

In an embodiment, the system 100 includes a processor(s) 104, communication interface device(s), alternatively referred as input/output (I/O) interface(s) 106, one or more data storage devices or a memory 102 operatively coupled to the processor(s) 104 and a set of sensors 110 deployed in a plurality of regions serviced by an entity. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 3B:
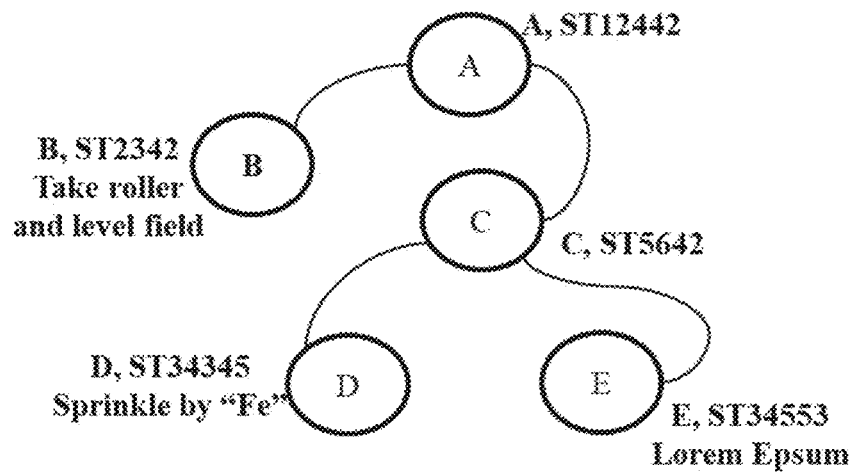
FIG. 3B depicts example Work Protocol (WP) and Compliance Protocol (CP) for computing the credit score, in accordance with some embodiments of the present disclosure.
Figure 3B:
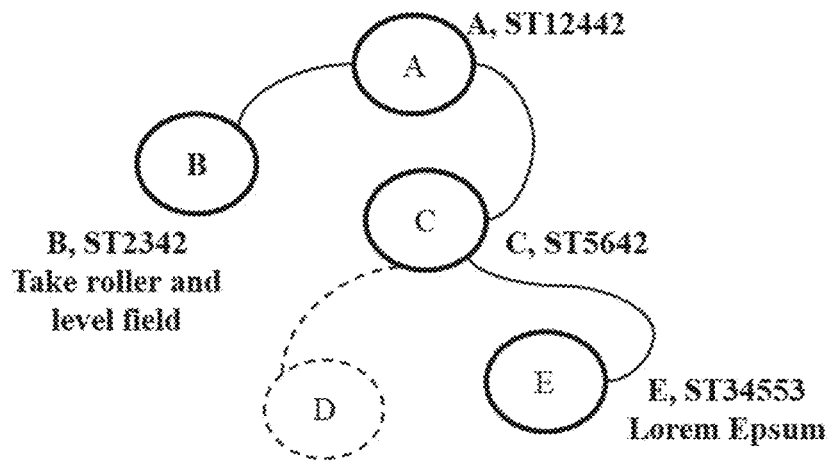

The set of sensors 110 collect metadata associated with each a plurality of nodes of a Compliance Protocol (CP) and a Work Protocol (WP), further explained in conjunction with FIGS. 3A and 3B.

Further, the memory 102 includes a database 108 that stores the CPs recorded corresponding a plurality of request generators and WPs corresponding to a plurality registered BEUs of the entity. The database 108, may also store the collected metadata and the like. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with flow diagram of FIGS. 2A through 4 and example culture graph generation of FIGS. 5A and 5B.

Figure 2A:
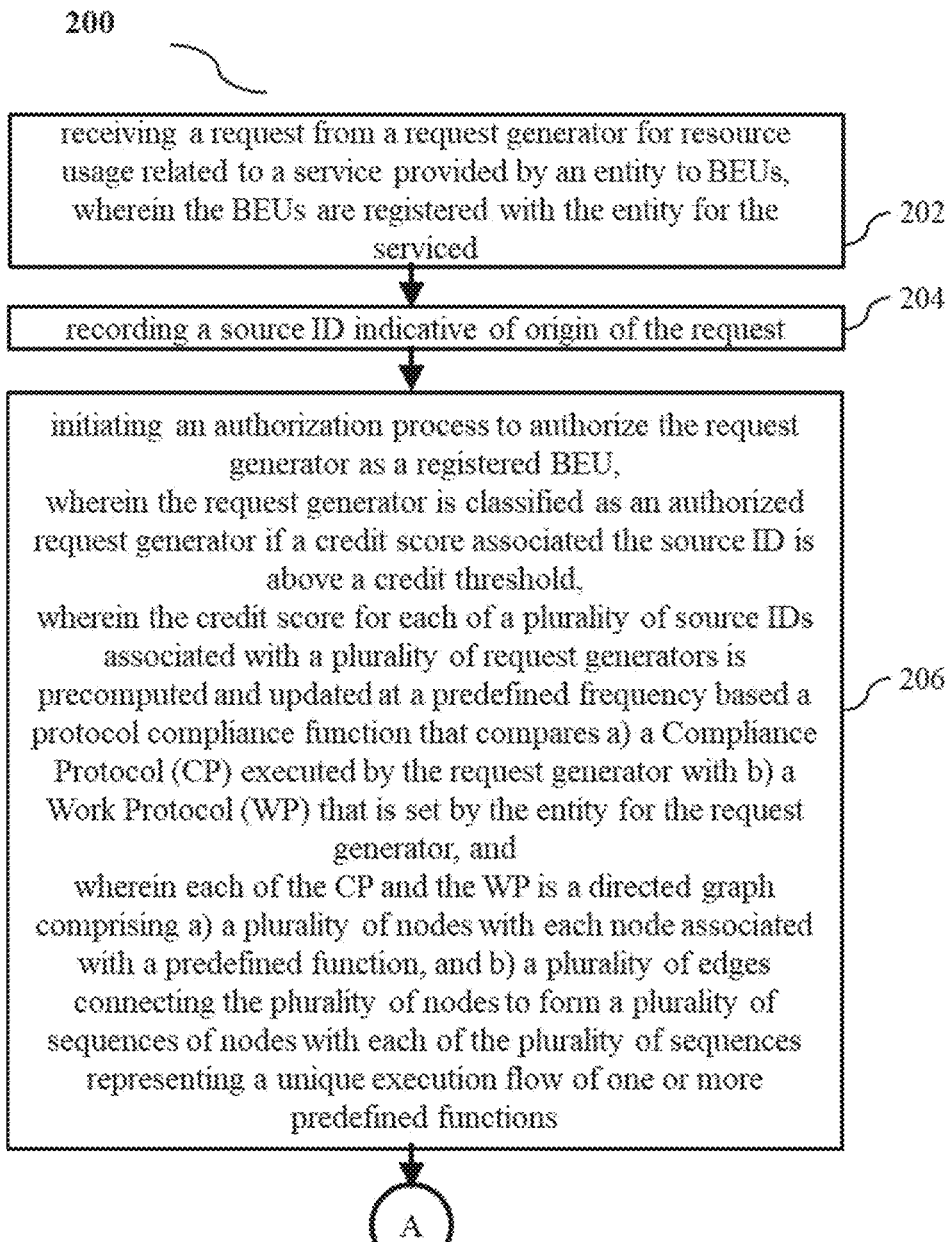
FIGS. 2A and 2B depict a flow diagram of a method for Proof of Work (POW) based protection of resources, using the system of FIG. 1, in accordance with some embodiments of the present disclosure.
Figure 2B:
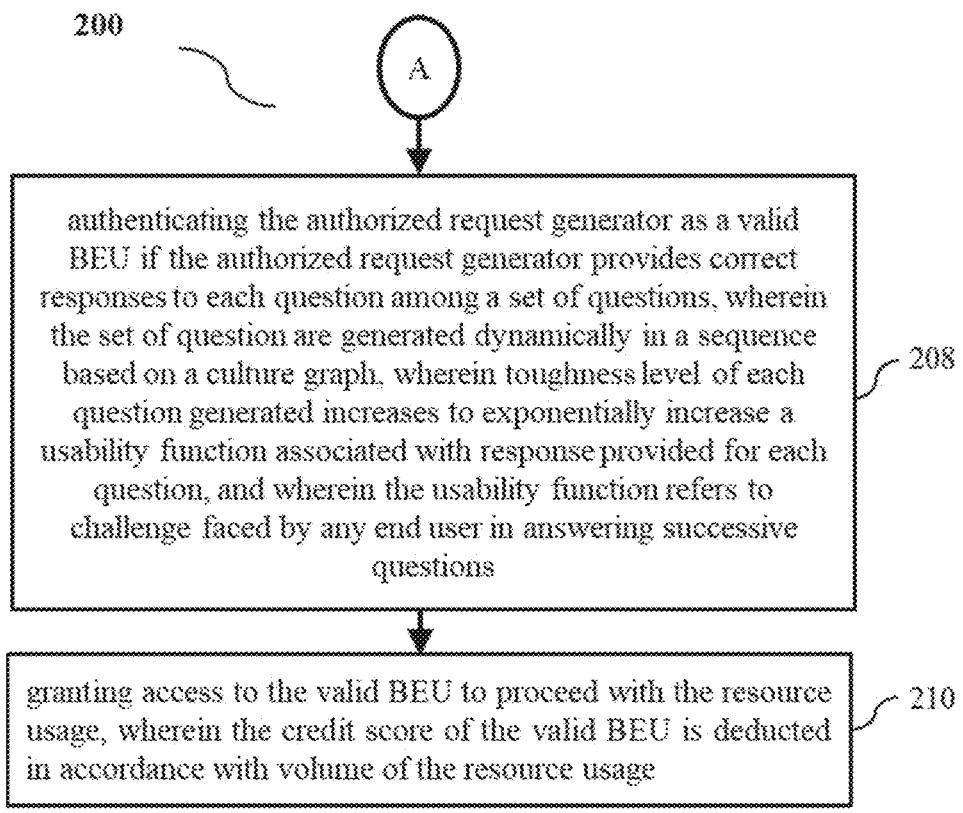

FIGS. 2A and 2B depict a flow diagram of a method for Proof of Work (POW) based protection of resources, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIGS. 2A through 5B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

The steps of method 200 is explained are explained with a use case example. The use case refers an entity, which may be a Digital farming based company that supplies agro-related products to its consumers, herein farmers who fall in category of the BEUs. The company may provide a service such as agro-consultation to its consumers (farmers), wherein the company may set up toll free numbers to avail consultation services. The toll free set up requires communication network resources of the company and the cost of network usage (resource usage) is bore by the company. The company intends to ensure that only true/valid consumers use the service via the toll free number or an IVR service (requiring communication network resources of the entity), and at the same time even control the valid user to avoid over usage or careless usage of the free resource. Thus, the method 200 disclosed herein enables authorizing and authenticating an end user, interchangeably referred as request generator, using Proof of Work (POW) based approach before granting the access to use the IVR service. Also, the entity charges the end user by deducting a digital currency generated for the end user. The monetary loss factor forces the end user to utilize the free service more carefully/cautiously.

Referring to the steps of the method 200, at step 202 of the method 200, the one or more hardware processors 104 receive a request from a request generator for resource usage related to a service provided by an entity to BEUs, wherein the BEUs are registered with the entity for the service consultation. For the example stated above, the service id IVR consultation service while the BEUs are the farmers. The request may be generated via any end devices, such a personal digital assistants or smart phones.

At step 204 of the method 200, the one or more hardware processors 104 record a source ID indicative of origin of the request. The source ID for the example above could be a registered mobile number of the BEU, a Unique identification ID of the request generator or any other identification that can enable authorization process for the request generator. Thus, the request generator can provide any of the one or more IDs that are identified by the system 100 for an authorization process.

At step 206 of the method 200, the one or more hardware processors 104 initiate the authorization process to authorize the request generator as a registered BEU. The request generator is classified as an authorized request generator if a credit score associated the source ID is above a credit threshold. The credit score for each of a plurality of source IDs associated with a plurality of request generators is precomputed and updated at a predefined frequency by the system 100 as a continuous background process. The credit score is based on a protocol compliance function that compares a) the Compliance Protocol (CP) executed by the request generator with b) the Work Protocol (WP) that is set by the entity for the request generator. The WP and the CP are directed graphs comprising a) a plurality of nodes with each node associated with a predefined function, and b) a plurality of edges connecting the plurality of nodes to form a plurality of sequences of nodes with each of the plurality of sequences representing a unique execution flow of one or more predefined functions.

For the example herein, with BEUs as farmers a sample CP is 'steps' a farmer has followed during farming in accordance with a previous consultation received during previous call to the IVR service of the entity. The sample WP refers to expected steps the farmer has to follow in accordance with the instructions. The CP can be derived from the response of the farmer to set of WP based questions. Natural Language processing techniques can be used to derive the directed graph from responses of farmers to the as directed graph which is a sequence of nodes connected via directed edges. This enables to record sequence of steps the farmer has followed as a tree-like data structure to be compared with similarly generated tree-like data structure for the WP. It can be understood that the CP is the POW end user (BEU/farmer) submits to the system 100, which is then compared with the expected work to be done as defined in the WP.

FIG. 3A is a flow diagram illustrating a method 300 for credit score computation for Proof of Work (POW) based protection of resources, using the system of FIG. 1, in accordance with some embodiments of the present disclosure.

Steps of computing the credit score based on the protocol compliance function comprises:

A) Comparing (302) the directed graph of the WP with the CP to identify a delta work difference. If the delta difference is zero the request generator is WP compliant end user and obtains a full value of the credit score, for the CP executed, and if the delta difference is non-zero the request generator is a WP non-compliant end user.

B) Computing (304) a partial value of the credit score, for the CP executed, representing percentage of compliance achieved by the request generator, if the delta difference is non-zero. The steps of computing the partial value of the credit score comprises:

a) Identifying a set of CP nodes among the plurality of nodes of the CP traversed by the request generator while executing the CP.

b) Computing a Levenshtein distance between i) the set of CP nodes and ii) a set of WP nodes among the plurality of nodes of the WP, that correspond to the set of CP nodes. The Levenshtein distance is indicative of deviation of the CP form the WP.

Using the Levenshtein distance, known in the art, between the set of CP nodes (representing string a of length |a|) and set of WP nodes (representing string b of length |b\ is given by $$lev(a, b) = \begin{cases} |a| & \text{if } |b| = 0, \\ |b| & \text{if } |a| = 0, \\ lev(\text{tail}(a), \text{tail}(b)) & \text{if } a[0] = b[0] \\ 1 + \min \begin{cases} lev(\text{tail}(a), b) \\ lev(a, \text{tail}(b)) \\ lev(\text{tail}(a), \text{tail}(b)) \end{cases} & \text{otherwise.} \end{cases}$$

c) Computing a compliance score by subtracting the Levenshtein distance from a predefined quantum (Y') of time which is based on context of economic culture associated with type of work identified in the CP and the WP. The compliance score decreases with increase in deviation of the CP from the WP. For example: in rural emerging countries, the predefined quantum is 52 time units, which represent 52 weeks in a year as the economic structure of society is around weekly durations.

d) Performing one of i) averaging and ii) summation of a plurality of compliance scores of the request generator for a predefined time span to generate the credit score for the request generator. The predefined time span can be last 1 year and in multiples of 1 year.

The method 300 further comprises collecting metadata associated with each of the plurality of nodes of the WP and the plurality of nodes of the CP. The collected metadata enables cross checking whether each of the plurality of nodes of the CP execute actions in accordance with predefined function associated with a corresponding node of the WP. The metadata is recorded by the entity using the set of sensors 110 deployed to track a plurality of actual actions performed by the request generator. The set of sensors 110 can be proxy sensors that provide satellite images, hyperspectral sensing, call log data, gyro data, accelerometer data collected from sensors on end devices used by the farmer such as smart phones. The metadata collected enables to have a physical check on actual work done. For example, say the farmer is advised to water the crop and spray pesticides at a given frequency. In response farmer provides to the questions posed to check compliance with the WP, the farmer may agree to performing all required actions. To physically cross check the execution of actions, collected meta data such as satellite images, hyperspectral imagery, location of farmer identified from GPS on the smart phones and the like can provide insights. The GPS data can provide information on whether the farmers was present at the farm site and duration of his presence. Increase in green zones and moisture presence detection from hyperspectral imaging data are indicative of result of actions performed by the farmer. The generation of CP is explained below:

a) Arranging the collected sensor data tuple in temporal order and forming a linked list.
 b) The list of measurements are sequenced and clustered as per time.
 c) Singular sequences could map to data structures like LL and collection of sequences in a time window will map to data structure tree.
 d) At the end CP is be generated as the directed graph representing a tree structure.

Thus, the WP can be a Plantation Advisory and Compliance. The Plantation Advisory consists of the sequence of steps the farmer has to take from land preparation, to seed preparation, nursery preparation, vegetation to harvesting. These are then also checked for compliance via a participatory systems aided by mobile phone based sensors (namely, comprising of GPS, Gyro sensor and usage of keypads/touch pads on the phone).

The protocol compliance function reduces the credit score in accordance with a preset criterion to exponentially increases the cost function for the request generator for every repeated attempt of the authorization process, post failure of a previous attempt of the authorization process. The cost function refers to challenge faced by the WP non-compliant end user in improving the credit score to be eligible for reuse of the resource. The cost function is measured in terms of decrease in credit score for every failed attempt. The usability function is measured in terms of toughness level of each question faced by any end user in answering successive questions. For example, say the percentage of the credit score deduction may double for every repeated attempt, thus costing the request generator to lose his credit score at faster rate if he is non-compliant repeatedly. This also forces the BEU (farmer) to follow the WP.

Further, it can be noted that even though the advisory is common, to a crop and thereby to an agroclimatic zone based farmer, the variances are introduced by each farmer and hence no two farmers are the same in terms of WP executed (which is the Proof of Work (POW) for the farmer. The POW is hence the mechanism on which each farmer will get say a Coin credit (credit score points). This coin credit is then utilized by a dialer application on the smart phone when the toll free number (IVR service) is called from the smartphone. Thus, the system 100 facilitates prevention of attacks on the resource usage by use of POW. In essence, those who do not follow the advisory protocol, also referred to as WP, of the entity and comply, cannot use the toll free number for themselves—there by preventing an attack since every attack now requires the acquisition of a coin/token (that is POW by farmer—which is constrained by nature and systems—as a farmer (BEU) can probably have not more than 3 seasons of cultivation in a Julian calendar.

FIG. 3B depicts example Work Protocol (WP) and Compliance Protocol (CP) for computing the credit score, in accordance with some embodiments of the present disclosure. Steps of generation of the WP for a sample farmer scenario are provided below:

1. There is a pan Country (Say pan-India) knowledge repository (KR) for all kinds of crops.
2. For each crop the KR has steps to be followed.
Crop 1
Step1, Step2, . . . {sowing to harvesting}
Step 2.1 {if pest attack do y}
Crop 2
Crop N
2. At the sign up by the end user (farmer/BEU), the system 100 collects basic information about the farmer (BEU), which includes Latitude-Longitude of his geolocation/farm from his land records. Using this information his agro-climatic zone can be inferred.
3. This information helps reduce (filter) KR into a subset for the inferred agro-climatic zone. For example, KR8 is for region 1 (Nashik) for grapes, versus KR9 in region 2 (Manipur) for rice variety R8892
4. BEU can choose KR from the inferred agro-climatic zone list or opt for a non-conventional KR using search.
5. Once the BEU selects a particular KR, userID gets mapped to KR0-3-4-5 etc.
6. Once the BEU has selected the KR, he is asked to confirm the selection, on receiving acknowledgement from BEU or the BEU provides consent, then the mapping is final. This is when WP gets created, which defines the expected work (set of functions) to be performed by the farmer and the maximum time limit for each of the function.

Say KR09 gets mapped to userID say KPKP98989KP. That tagging of userID to KRID is the relation called WP01.
Sample WP File:

```
<WP id=WP34534 url="tcs.com/wp">
<UserID> KPKP8899K </UserID>
<LandRecID> 023234 </LandRecID>
<Plot> PL0234 </Plot>
<Season> Four </Season>
<Phase> One </Phase>
<date> 31Mar2021 </date>
<TimePhase> Morning/Noon/Eve/Night <TimePhase>
<TimeStamp> 00:23:23 </TimeStamp>
<Step id="ST12442" repeat=true>
<SubStep id="ST2342"starttime="09:00:00"endtime="">Take a roller and level the field of 200 meters by 200 meter </SubStep>
<SubStep id="5T5642"starttime="09:00:00" endtime="">
<Condition name=SoilCond>
<SoilCond> Iron Defiency </SoilCond>
</condition>
<IF>
<Deficiency> </Deficiency>
<Then>
<Action id="AC028284" locale="hr">
<step id="ST34345">Sprinkle "Fe" in 25 m by 25 m plot </Step>
<video>abcd.mp4</video>
<image>img.png</image>
<voice>voc.qcp</voice>
<text>Lorem Ipsum</text>
<notification>
<sms></sms>
<whatsapp></whatsapp>
<ivr></ivr>
</notification>
</Action>
</Then>
</IF>
<ELSEIF>
<Then>
<Action id="AC0223289">... </Action>
</Then>
</ELSEIF>
```

```
</SubStep>
<SubStep>...</SubStep>
</Step>
</WP>
```

As depicted in FIG. 3B, the CP and the WP are depicted as a directed graph, wherein the directed graph formed by nodes (B, A, C, D, E) is the WP representing a tree structure, while the directed graph generated from predefined functions reported by the farmer is the CP. The CP is generated in accordance with method 300 and based on meta data obtained for the farmer, corresponding to predefined functions. The CP is the directed graph of the CP represented by (B, A, C, E), which is a linked list. Thus, finding the delta difference between the directed graphs of the WP and the CP, Lev distance=Lev[(B,A,D,C,E)–(B,A,C,E)]→1(difference of one node as D node was not captured in actions recorded for the farmer)

Compliance score=52weeks(predefined quantum of timeY)–Lev distance(1)=53

Averaging compliance score for a predefined time T to compute credit score.

Referring back to step 208 of the method 200, at step 208, the one or more hardware processors 104 authenticate the authorized request generator as a valid BEU a response to each question among a set of questions provided by the authorized request generator is correct. The set of question are generated dynamically in a sequence based on a culture graph, wherein toughness level of each question generated increases to exponentially increase a usability function associated with response provided for each question. The usability function refers to challenge faced by any end user in answering successive questions.

Figure 4:
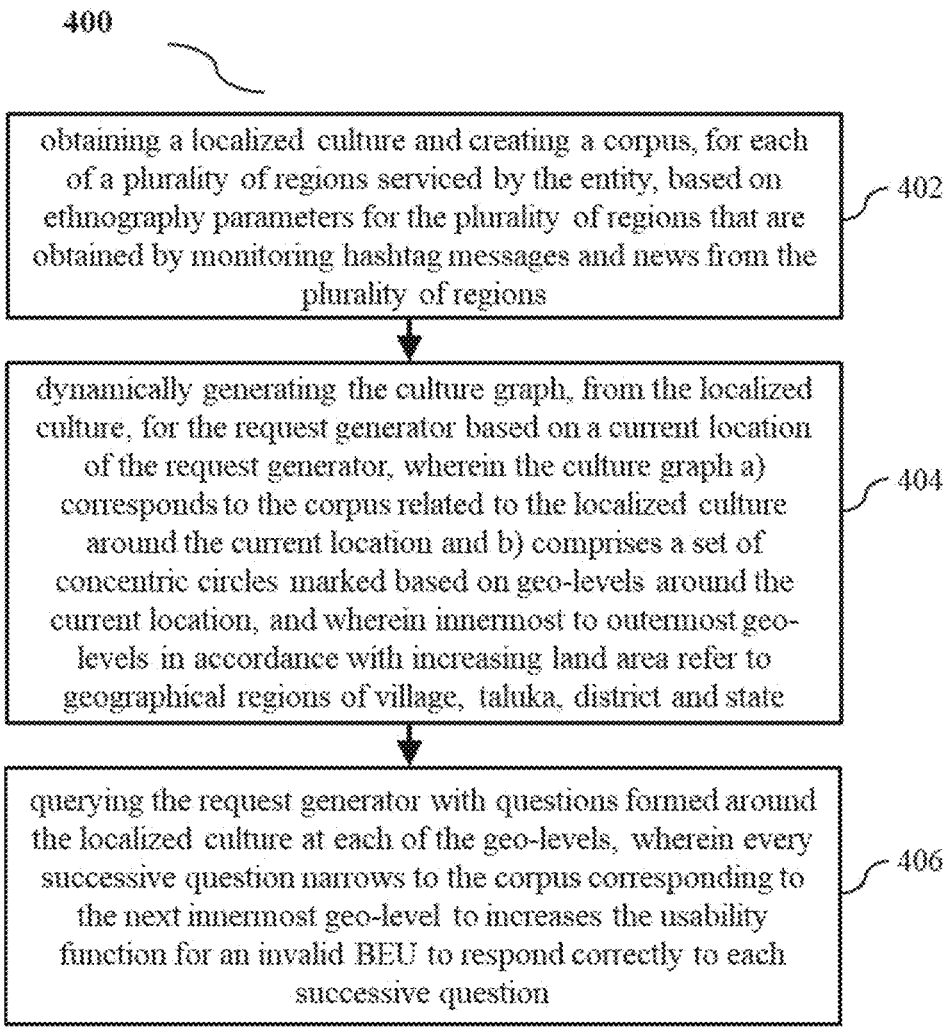
FIG. 4 is a flow diagram illustrating a method for generating a set of questions based on a culture graph for Proof of Work (POW) based protection of resources, using the system of FIG. 1, in accordance with some embodiments of the present disclosure.

FIG. 4 is a flow diagram illustrating a method 400 for generating a set of questions based on a culture graph for Proof of Work (POW) based protection of resources, using the system of FIG. 1, in accordance with some embodiments of the present disclosure.

Figure 5A:
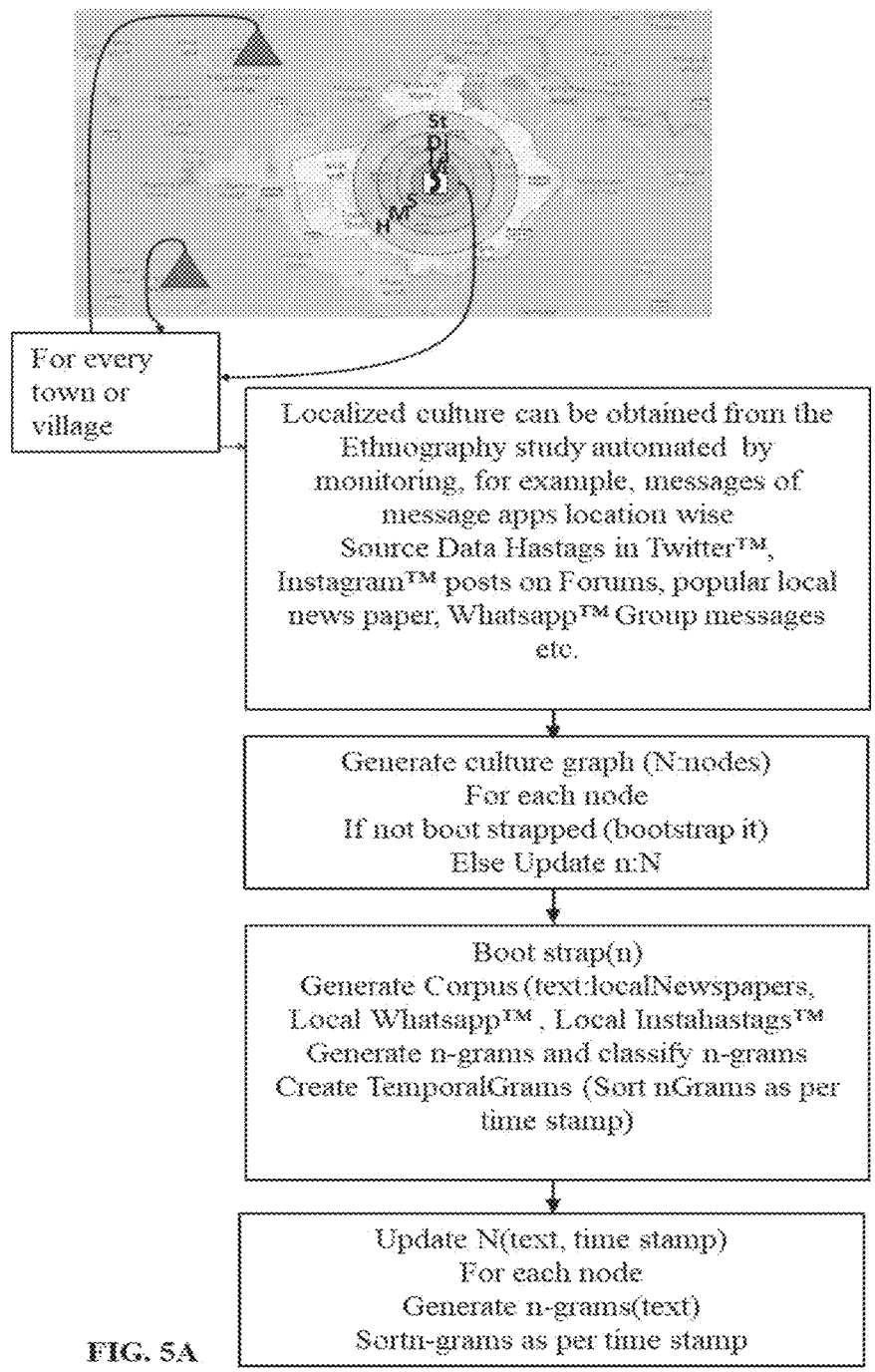
FIGS. 5A and 5B depict culture graph generation based om sample geo-levels sample, in accordance with some embodiments of the present disclosure.

Steps of dynamically generating the set of questions based on the culture graph comprises:

A) Obtaining (402) a localized culture and creating a corpus, for each of a plurality of regions serviced by the entity, based on ethnography parameters for the plurality of regions. The ethnography parameters can be obtained by monitoring hashtag messages and news from the plurality of regions such as from messaging applications, social media, new paper articles as depicted in FIG. 5A.

B) Dynamically (404) generating the culture graph, from the localized culture, for the request generator based on a current location of the request generator. The culture graph a) corresponds to the corpus related to the localized culture around the current location and b) comprises a set of concentric circles marked based on geo-levels around the current location. The corpus generation is depicted in FIG. 5A. the innermost to outermost geo-levels in accordance with increasing land area refer to geographical regions of village (Vi), taluka (Ta), district (Di), and state (St) as can be seen in FIG. 5A.

The culture graph is generated using a culture function (c). The culture function (c) for a quantum (Q) used is given by:

$$c(t,d)=Q, \qquad (2)$$

C) where c is culture function, t is time, d is distance and Q is the predefined quantum of time. Thus, the culture function c gives value to understand localized culture over a period of time t, considering the distance between caller (request generator) and toll free number (communication network resource of the entity) using GPS location (latitude and longitude of the caller). Thus quantum (Q) computed of culture is be fixed for certain unit of 't'. For FIG. 5A, the culture function is c(t, d)=(Small (S), Medium(M), Large (L))Querying (406) the request generator with questions formed around the localized culture at each of the geo-levels, wherein every successive question narrows to the corpus corresponding to the next innermost geo-level to increases the usability function for an invalid BEU, wherein the invalid BEU faces challenge to respond correctly to each successive question.

D) Value of quantum (Q) of culture will be changing with respect to time as depicted by:

$$\frac{dQ}{dt} = \frac{\text{rate of change of } Q}{\text{rate of } chnage \text{ of } t} = Q1, Q2, Q3, Q \ldots \qquad (2)$$

Table 1 below provides questions generated based on culture graph generated from geo-levels of FIG. 5B for a source ID/user ID and KR associated.

TABLE 1

| Geo-levels c(t) Difficulty of question | | VILLAGE-KR | TALJUKA-KR | DIST-KR | STATE-KR |
|---|---|---|---|---|---|
| | Maximum | | | | Minimum |
| | Cluster | Vi | Ta | Di | St |
| | L0 | L1 | L2 | L3 | L4 |
| | Last birthday celebration in your cluster? | ST Bus timing for adjoining village? | Name of revenue officer of Taluka | Name of dentist in district hospital? | Capital of the state? |
| | Last wedding celebration in your cluster? | Name of gram panchayat member? | Name of talathi? | Name of district hospital? | Where is mantralay? |
| | Name of a new couple? | | Mobile number of talathi? | Address of district hospital? | Name of CM? |
| | Nickname of your neighbor? | Name of the bank whose cheque book | Name of the bank whose ATM you | | Local language movie released in last week? |

TABLE 1-continued

| | |
|---|---|
| you use?<br>Local language movie currently running in your theatre? | use? |

Few more examples for rate of change of Q are provided below:
For movies:

$$\frac{dQ}{dt} = 1 \text{ day, } 1 \text{ week, } N \text{ weeks, } 1 \text{ month, } n \text{ momths, } 1 \text{ year, } N \text{ years}$$

For fast fashion:

$$\frac{dQ}{dt} = \text{spring, summer, } autmn, \text{ winter}$$

For fast food:

$$\frac{dQ}{dt} = 1 \text{ day, } 1 \text{ month, } 1 \text{ year, } n \text{ years}$$

The culture function c (t) for the above example to generate the culture graph is:

$$c(t) = \text{apparel,movies,fastfood} \quad (3)$$

Wherein apparel changes are less frequent as compared to movie trend, which is further less frequent as compared to fashion trend in the area/geo circle of interest. Thus, questions generated based on fast food trends are challenging as variations in answers are more as time elapses, while questions generated on apparels are comparatively easier as fashion is steady and changes with seasons, not per day. Same is depicted in table 2 below:

TABLE 2

| c(t) = | day | week | year |
|---|---|---|---|
| | t1 | t2 | t3 |
| | Hard | Medium | Simple |
| | Marabat | Sairat Movie | Wada Pav |

Figure 5B:
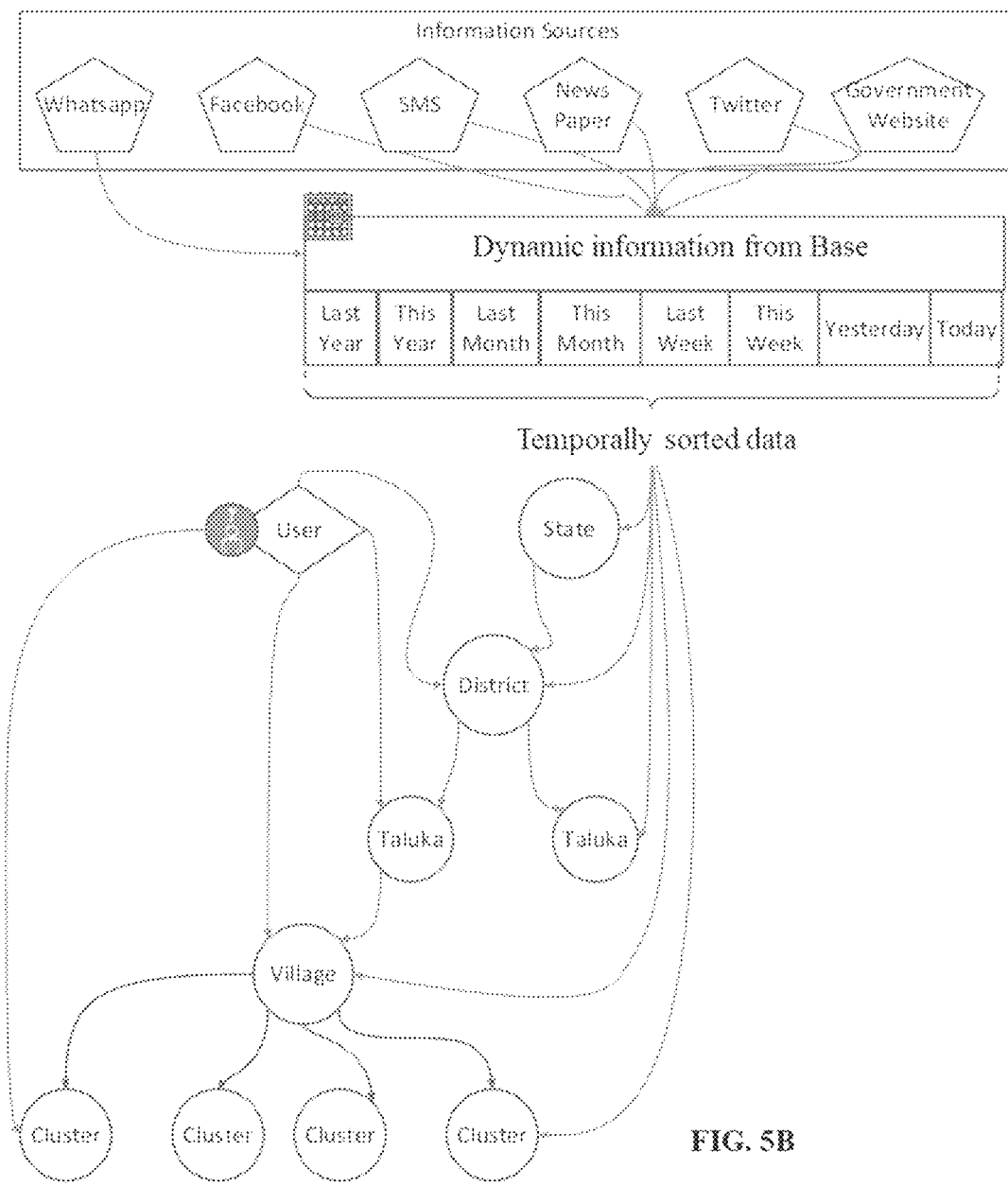

FIG. 5B depicts the culture graph generation based on sample geo-levels, in accordance with some embodiments of the present disclosure. FIG. 5B depicts the operating structure and logic of the dynamic "what you know" question bank for a particular levels of geography. The information bank structure is divided into the administrative structures of State (St) containing Districts (Di) containing Talukas (Ta) containing Villages (Vi) containing Clusters. Various information sources such as NewsPapers, WhatsApp messages, Websites, Twitter are accessed at a regular interval of 1 day. This collected corpus is then analyzed, as depicted in FIG. 5A, using Natural Language Processing techniques such as N-gram (ex. tri gram for popular phrases) to construct a corpus of the tuple {WHatYouKnow, LifeStamp, Location (C luster/Village/Taluka/District/State)}.

Example would be {"Marbat", "Perpetual", "Nagpur"}. This says that the phrase "Marbat" is hyper-local to the Taluka of Nagpur and is perpetual (known for 3 generations of humans}.

As depicted in FIG. 5B, the UserID is tagged to the structure of the Information at every unit {village, taluka, district, state) so that appropriate level Question can be posed by randomly selected from the corpus of question which is getting continuously generated and updated.

Further, at step 210 of the method 200, the one or more hardware processors 104 grant access to the valid BEU to proceed with the resource usage, wherein the credit score of the valid BEU is deducted in accordance with volume of the resource usage. Thus, this keeps a check on careless, over usage of the resource even for the authorized and authenticated end user (registered valid BEU).

Thus, the method and system disclosed herein provides a two level check for protection of resources using the usability function and the cost function. The usability function is based on the culture function (c), which makes resource usage easy for the authentic user and hard to use for the external attacker. Similarly, the cost function based on the protocol compliance function is skewed in favor of the authorized user and hard for the external attacker, thus the fake user will lose credit points for every failed attempt with exponential deduction in credit score, and in turn exponentially increasing cost of reuse of the resource for the fake user.

Thus, the method and system disclosed herein provide the resource protection in two dimensions of usability and cost, wherein for the valid BEU the system is high on the usability scale and security scale at the same time difficult for the external attacker, invalid user or a fake consumer. The method disclosed also exploits natural limits of resources to generate WPs and culture graphs. For example, for BEUs that are farmers, time consideration based on agricultural seasons as a sub-unit of cost of acquisition, a sort of upper limit imposed by laws of Nature.

For example, every year has few seasons—namely, Summer, Winter, Rain {Spring}, referred as the set of Seasons. This is a finite set. That is the number of elements in this set is finite and countable. Here the max value is 3 elements (3 seasons). Within each Season, a BEU can take Zero/None agriculture work or all work, in the seasons. In some seasons such as Winter, he can take 2 crops. Each crop is called a cycle. Hence 2 cycles in Winter. Since the set of Seasons is finite and countable. By Implications, the set of AgriCycle (AC) is also finite and countable. Here, the number of max elements in this set is thus 4. Even if the user were to use hydroponics with some state of the art see and hormone, the crop will take a minimum of 1 week to grow into a harvesting state. Thus, it still cannot exceed 52 (number of weeks in a year) as a theoretical imaginable value. From practical view, it is max 4 as of today.

$$\text{AgriCycle(AC)} = F(x : X \; E\text{Seasons})\text{Seasons} = \{\text{Summer, Winter,Rain}\}$$

Hence max AgriCycle=$\{0 < x <= 4\}$(finite set)

Similarly, a BEU inherits a geography in which agri cultivation happens—say state of Rajasthan. Again, by laws of nature, the soil type in this region is fixed—Sandy, Loomy. That is a fixed countable set. One cannot have an infinite value for the set of soil types for a given geography. This maximum value is the upper limit.

SoilType(ST)={Clay,Sandy, . . . }//Finite Set

Similarly, given the type of soil, the types crops which can be grown is also a finite set.

TypeOfCrop(TOC)=$F${st:ST}

Hence max TypeOfCrop={$0<x<=10$}(finite set)

Thus, by same reasoning, the WP for a given userId is finite and countable. That is there is an upper limit to the WP value.

Hence,max $WP$(UId)=$F${toc,ac,toc:TypeOfcrop,ac: AgriCycle}

Hence max $WP${UID(toc,ac)=$0<x<=40$

Thus, 40 is the maximum units for the set UID: TOC x AC, as a measure of Natural Limits.

Max Weeks in a Year(WOY)=52

Hence max WPCredit(WPC){UID(toc,ac,woy) =$0<x<=2080$

Hence WPC=max TOCxACxWOY{$0<x<=2080$}

With help of above examples, it can be noted that there exists finiteness in a WP, which makes the system 100 inherently stable, and bounded. Thus, the credit score a BEU can gain will always have a defined range, wherein lower limit of the credit score is zero and does not permit negative balance. Similarly, the upper limit is introduced by laws of nature as explained above, whereby credit score gained by a BEU post following a WP cannot cross the upper limit, since his maximum work capacity is bounded by laws of nature that the system 100 takes into consideration.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for Proof of Work (POW) based protection of a plurality of resources, comprising:
receiving, via one or more hardware processors, a request from a request generator for a usage of a resource of the plurality of resources associated with a service, wherein
the request generator is Basic Emergent Users (BEUs),
the request is related to the service provided by an entity to the BEUs,
the BEUs are registered with the entity for the service, and the resource is a plurality of communication network resources;

recording, via the one or more hardware processors, a source identity (ID) indicative of an origin of the request;

dynamically generating, via the one or more hardware processors, in a sequence, based on a culture graph, a set of questions, wherein the dynamic generation of the set of questions comprises:

determining, via a Global Positioning System (GPS) sensor coupled with the one or more hardware processors, a geolocation of the request generator;

obtaining a localized culture and creating a corpus, for each of a plurality of regions serviced by the entity, based on ethnography parameters for the plurality of regions that are obtained by monitoring hashtag messages and news from the plurality of regions;

dynamically generating the culture graph based on the localized culture and the determined geolocation of the request generator, wherein geo-levels of the determined geolocation increase from innermost geo-levels to outermost geo-levels in accordance with increasing of a land area of the determined geolocation, wherein the land area includes geographical regions of a village, a taluka, a district and a state; and querying the request generator with the set of questions chosen using the localized culture at each of the geo-levels, wherein every successive question narrows to the corpus corresponding to a next innermost geo-level to increase the usability function for an invalid BEU of the BEUs to respond correctly to each successive question, a difficulty level of each question of the set of questions increases from a first level to a second level to exponentially increase the usability function associated with a response provided by the request generator for each question of the set of questions, the second level is higher than the first level, the culture graph corresponds to the corpus related to the localized culture around the geolocation of the request generator, the culture graph comprises a set of concentric circles marked based on geo-levels around the geolocation of the request generator, and the usability function is measured in terms of the difficulty level of each question faced by the request generator in answering successive questions;

deriving, via the one or more hardware processors, a directed graph of a Compliance Protocol (CP) and a directed graph of a Work Protocol (WP) from the response, using Natural Language processing techniques, wherein the WP is specific actions set by the entity for the request generator;

computing, via the one or more hardware processors, a credit score based on a protocol compliance function, wherein the computation of credit score comprises:

comparing the derived directed graph of the WP with the derived directed graph of the CP to identify a delta work difference;

determining whether the delta difference is equal to zero to determine the request generator is a WP compliant end user; and obtaining a full value of the credit score for the CP executed based on the determination that the delta difference is equal to zero;

authorizing, via the one or more hardware processors, the request generator as a registered BEU based on a credit score associated with the source ID, wherein the request generator is classified as an authorized request generator based on the credit score that is above a credit threshold, the credit score is computed and updated at a predefined frequency based on the protocol compliance function that compares a) the CP executed by the request generator with b) the WP that is set by the entity for the request generator, the derived directed graph of the CP and the derived directed graph of the WP comprises:

a) a plurality of nodes with each node associated with a predefined function, and b) a plurality of edges connecting the plurality of nodes to form a plurality of sequences of nodes with each of the plurality of sequences representing a unique execution flow of one or more predefined functions;

collecting, via a plurality of proxy sensors coupled with the one or more hardware processors, metadata associated with each of the plurality of nodes of the CP and the plurality of nodes of the WP; wherein the collected metadata includes satellite image data associated with each of plurality of nodes of the CP and the plurality of nodes of the WP, hyperspectral sensing data of each of plurality of nodes of the CP and the plurality of nodes of the WP, call log data of each of plurality of nodes of the CP and the plurality of nodes of the WP, gyro data of each of plurality of nodes of the CP and the plurality of nodes of the WP, and accelerometer data of each of plurality of nodes of the CP and the plurality of nodes of the WP, wherein the CP is generated based on the collected metadata, wherein the generation of the CP comprises:

arranging the collected metadata in a temporal order and forming a linked list;

sequencing the linked list and clustering as per time;

mapping the linked list to a data structure; and generating, based on the mapping, the CP as the directed graph representing a tree structure;

tracking, based on the collected metadata and the generated CP, a plurality of actual actions performed by the request generator;

cross checking, based on the collected metadata and the tracked plurality of actual actions performed the request generator, whether each of the plurality of nodes of the CP executed the actual actions in accordance with the predefined function associated with a corresponding node of the WP, wherein the determined geolocation of the request generator enables to cross check whether the request generator performing the actual actions in a farm site, the hyperspectral sensing data indicates increase in green zones moisture presence detection data, the hyperspectral sensing data enables to cross check results of the actual actions performed by the request generator;

verifying, via the one or more hardware processors, based on the crosschecking that each of the plurality of nodes of the CP executed the actual actions in accordance with the predefined function, whether the response provided for each question of the set of questions matches with the plurality of actual actions; and authenticating, via the one or more hardware processors, the authorized request generator as a valid BEU, wherein the authentication is based on the verification that the response provided for each question of the set of questions matches with the plurality of actual actions;

granting, based on the authentication, via the one or more hardware processors, access to the valid BEU to proceed with the resource usage; and deducting, via the one or more hardware processors, the credit score of the valid BEU based on the usage of the resource.

2. The method as claimed in claim 1, further comprising:

determining whether the request generator is a WP non-compliant end user based on the delta difference that is non-zero; and computing, based on the non-zero delta difference, a partial value of the credit score, wherein the partial value represents a percentage of compliance achieved by the request generator, wherein computing the partial value of the credit score comprises:
  a) identifying a set of CP nodes among the plurality of nodes of the CP traversed by the request generator while executing the CP;
  b) computing a Levenshtein distance between i) the set of CP nodes and ii) a set of WP nodes among the plurality of nodes of the WP, that correspond to the set of CP nodes, wherein the Levenshtein distance is indicative of deviation of the CP from the WP;
  c) computing a compliance score by subtracting the Levenshtein distance from a predefined quantum of time which is based on context of economic culture associated with type of work identified in the WP and the CP, wherein the compliance score decreases with increase in deviation of the CP from the WP; and
  d) performing one of i) averaging, ii) summation of a plurality of compliance scores of the request generator for a predefined time span to generate the credit score for the request generator.

3. The method as claimed in claim 1, further comprising reducing, the credit score, using the protocol compliance function, based on a preset criterion to exponentially increase a cost function for the request generator for every repeated attempt of the authorization process, post failure of a previous attempt of the authorization process, wherein the cost function is measured in terms of decrease in the credit score for every failed attempt.

4. A system for Proof of Work (POW) based protection of a plurality of resources, comprising:
  a memory storing instructions;
  one or more Input/Output (I/O) interfaces;
  a plurality of proxy sensors;
  a Global Positioning System (GPS) sensor; and
  one or more hardware processors coupled to each of the memory, the plurality of proxy sensors, and the GPS sensor via the one or more I/O interfaces, wherein the one or more hardware processors are configured by the instructions to:
    receive a request from a request generator for a usage of a resource of the plurality of resources, wherein the request generator is Basic Emergent Users (BEUs),
    the request is related to a service provided by an entity to the BEUs,
    the BEUs are registered with the entity for the service, and
    the resource is a plurality of communication network resources;
  record a source identity (ID) indicative of an origin of the request;
  dynamically generate, in a sequence, based on a culture graph, a set of questions, wherein the dynamic generation of the set of questions comprises:
    determining, via the GPS sensor, a geolocation of the request generator;
    obtaining a localized culture and creating a corpus, for each of a plurality of regions serviced by the entity, based on ethnography parameters for the plurality of regions that are obtained by monitoring hashtag messages and news from the plurality of regions;
    dynamically generating the culture graph based on the localized culture and the determined geolocation of the request generator, wherein geo-levels of the determined geolocation increase from innermost geo-levels to outermost geo-levels in accordance with increasing of a land area of the determined geolocation, wherein the land area includes geographical regions of a village, a taluka, a district and a state; and
    querying the request generator with the set of questions chosen using the localized culture at each of the geo-levels, wherein every successive question narrows to the corpus corresponding to a next innermost geo-level to increase the usability function for an invalid BEU of the BEUs to respond correctly to each successive question,
    a difficulty level of each question of the set of questions increases from a first level to a second level to exponentially increase the usability function associated with a response provided by the request generator for each question of the set of questions,
    the second level is higher than the first level, and
    the culture graph corresponds to the corpus related to the localized culture around the geolocation of the request generator,
    the culture graph comprises a set of concentric circles marked based on geo-levels around the geolocation of the request generator, and
    the usability function is measured in terms of the difficulty level of each question faced by the request generator in answering successive questions;
  derive a directed graph of a Compliance Protocol (CP) and a directed graph of a Work Protocol (WP) from the response, using Natural Language processing techniques, wherein the WP is specific actions set by the entity for the request generator;
  compute a credit score based on a protocol compliance function, wherein the computation of credit score comprises:
    comparing the derived directed graph of the WP with the derived directed graph of the CP to identify a delta work difference;
    determining whether the delta difference is equal to zero to determine the request generator is a WP compliant end user; and obtaining a full value of the credit score for the CP executed based on the determination that the delta difference is equal to zero;

authorize the request generator as a registered BEU based on a credit score associated with the source ID, wherein
  the request generator is classified as an authorized request generator based on the credit score that is above a credit threshold,
  the credit score is computed and updated at a predefined frequency based on the protocol compliance function that compares a) the CP executed by the request generator with b) the WP that is set by the entity for the request generator,
  the derived directed graph of the CP and the directed graph of the WP comprises:
    a) a plurality of nodes with each node associated with a predefined function, and
    b) a plurality of edges connecting the plurality of nodes to form a plurality of sequences of nodes with each of the plurality of sequences representing a unique execution flow of one or more predefined functions;

collect, via the plurality of proxy sensors, metadata associated with each of the plurality of nodes of the CP and the plurality of nodes of the WP, wherein the collected metadata includes satellite image data associated with each of plurality of nodes of the CP and the plurality of nodes of the WP, hyperspectral sensing data of each of plurality of nodes of the CP and the plurality of nodes of the WP, call log data of each of plurality of nodes of the CP and the plurality of nodes of the WP, gyro data of each of plurality of nodes of the CP and the plurality of nodes of the WP, and accelerometer data of each of plurality of nodes of the CP and the plurality of nodes of the WP, wherein the CP is generated based on the collected metadata, wherein the generation of the CP comprises:
  arranging the collected metadata in a temporal order and forming a linked list;
sequencing the linked list and clustering as per time;
  mapping the linked list to a data structure; and
  generating, based on the mapping, the CP as the directed graph representing a tree structure;

track, based on the collected metadata and the generated CP, a plurality of actual actions performed by the request generator;

cross check, based on the collected metadata and the tracked plurality of actions performed the request generator, whether each of the plurality of nodes of the CP executed the plurality of actual actions in accordance with the predefined function associated with a corresponding node of the WP, wherein
  the determined geolocation of the request generator enables to cross check whether the request generator performing the plurality of actual actions in a farm site,
  the hyperspectral sensing data indicates increase in green zones and moisture presence detection data,
  the hyperspectral sensing data enables to cross check results of the plurality of actual actions performed by the request generator;

verify, based on the crosschecking that each of the plurality of nodes of the CP executed the plurality of actual actions in accordance with the predefined function collected metadata, whether the response provided by the request generator matches with the plurality of actual actions is correct; and authenticate the authorized request generator as a valid BEU, wherein the authentication is based on the verification that the response provided for each question of the set of question matches with the plurality of actual actions determination that the response to each question among the set of questions provided by the authorized request generator is correct;

grant, based on the authentication, access to the valid BEU to proceed with the resource usage; and deduct the credit score of the valid BEU based on the usage of the resource.

5. The system as claimed in claim 4, wherein the one more hardware processors are further configured to
  determine whether the request generator is a WP non-compliant end user based on the delta difference that is non-zero; and
  compute, based on the non-zero delta difference, a partial value of the credit score, wherein the partial value represents a percentage of compliance achieved by the request generator wherein computing the partial value of credit score comprises:
    a) identifying a set of CP nodes among the plurality of nodes of the CP traversed by the request generator while executing the CP;
    b) computing a Levenshtein distance between i) the set of CP nodes and ii) a set of WP nodes among the plurality of nodes of the CP, that correspond to the set of CP nodes, wherein the Levenshtein distance is indicative of deviation of the CP form the WP;
    c) computing a compliance score by subtracting the Levenshtein distance from a predefined quantum of time which is based on context of economic culture associated with type of work identified in the WP and the CP, wherein the compliance score decreases with increase in deviation of the CP from the WP; and
    d) performing one of i) averaging or ii) summation of a plurality of compliance scores of the request generator for a predefined time span to generate the credit score for the request generator.

6. The system as claimed in claim 4, wherein the one more hardware processors are further configured to reduce the credit score, using the protocol compliance function, based on a preset criterion to exponentially increases a cost function for the request generator for every repeated attempt of the authorization process, post failure of a previous attempt of the authorization process, wherein the cost function is measured in terms of decrease in the credit score for every failed attempt.

7. One or more non-transitory machine readable information storage mediums comprising one or more instructions, which when executed by one or more hardware processors causes:
  receiving a request from a request generator for a usage of a resource, wherein
    the request generator is Basic Emergent Users (BEUs),
    the request is related to a service provided by an entity to BEUs,
    the BEUs are registered with the entity for the service, and
    the resource is a plurality of communication network resources;
  recording a source identity (ID) indicative of an origin of the request;
  dynamically generating, in a sequence, based on a culture graph, a set of questions, wherein the dynamic generation of the set of questions comprises:
   determining, via a GPS sensor a geolocation of the request generator;
   obtaining a localized culture and creating a corpus, for each of a plurality of regions serviced by the entity, based on ethnography parameters for the plurality of regions that are obtained by monitoring hashtag messages and news from the plurality of regions;
   dynamically generating the culture graph based on the localized culture and the determined geolocation of the request generator, wherein geo-levels of the determined geolocation increase from innermost geo-levels to outermost geo-levels in accordance with increasing of a land area of the determined geolocation, wherein the land area includes geographical regions of a village, a taluka, a district and a state; and
   querying the request generator with the set of questions chosen using the localized culture at each of the geo-levels, wherein every successive question narrows to the corpus corresponding to a next innermost geo-level to increase the usability function for an invalid BEU of the BEUs to respond correctly to each successive question,
a difficulty level of each question of the set of questions increases from a first level to a second level to exponentially increase the usability function associated with a response provided by the request generator for each question of the set of questions,
the second level is higher than the first level,
the culture graph corresponds to the corpus related to the localized culture around the geolocation of the request generator,
the culture graph comprises a set of concentric circles marked based on geo-levels around the geolocation of the request generator, and
the usability function is measured in terms of the difficulty level of each question faced by the request generator in answering successive questions;
deriving a directed graph of a Compliance Protocol (CP) and a directed graph of a Work Protocol (WP) from the response, using Natural Language processing techniques, wherein the WP is specific actions set by the entity for the request generator;
computing a credit score based on a protocol compliance function, wherein the computation of credit score comprises:
   comparing the derived directed graph of the WP with the derived directed graph of the CP to identify a delta work difference;
   determining whether the delta difference is equal to zero to determine the request generator is a WP compliant end user; and
   obtaining a full value of the credit score for the CP executed based on the determination that the delta difference is equal to zero;
authorizing the request generator as a registered BEU based on a credit score associated with the source ID, wherein
   the request generator is classified as an authorized request generator based on the credit score that is above a credit threshold,
   the credit score is computed and updated at a predefined frequency based on the protocol compliance function that compares a) the CP executed by the request generator with b) the WP that is set by the entity for the request generator,
the derived a directed graph of the CP and the derived directed graph of the WP comprises:
   a) a plurality of nodes with each node associated with a predefined function, and
   b) a plurality of edges connecting the plurality of nodes to form a plurality of sequences of nodes with each of the plurality of sequences representing a unique execution flow of one or more predefined functions;
collecting, via a plurality of proxy sensors, metadata associated with each of the plurality of nodes of the CP and the plurality of nodes of the WP, wherein the collected metadata includes satellite image data associated with each of plurality of nodes of the CP and the plurality of nodes of the WP, hyperspectral sensing data of each of plurality of nodes of the CP and the plurality of nodes of the WP, call log data of each of plurality of nodes of the CP and the plurality of nodes of the WP, gyro data of each of plurality of nodes of the CP and the plurality of nodes of the WP, and accelerometer data of each of plurality of nodes of the CP and the plurality of nodes of the WP, wherein the CP is generated based on the collected metadata, wherein the generation of the CP comprises:
   arranging the collected metadata in a temporal order and forming a linked list;
   sequencing the linked list and clustering as per time;
   mapping the linked list to a data structure; and
   generating, based on the mapping, the CP as the directed graph representing a tree structure;
tracking, based on the collected metadata and the generated CP, a plurality of actual actions performed by the request generator, wherein the metadata includes satellite images, hyperspectral sensing data, call log data, gyro data, accelerometer data;
cross checking, based on the collected metadata and the tracked plurality of actions performed the request generator, whether each of the plurality of nodes of the CP executed the plurality of actual actions in accordance with the predefined function associated with a corresponding node of the WP, wherein
   the determined geolocation of the request generator enables to cross check whether the request generator performing the plurality of actual actions in a farm site,
   the hyperspectraldata indicates increase in green zones and moisture presence detection data, and
   the hyperspectral sensing data enables to cross check results of the plurality of actual actions performed by the request generator;
verifying, based on the crosschecking that each of the plurality of nodes of the CP executed actions in accordance with the predefined function, whether the response provided by the authorized request generator is matches with the plurality of actual actions; and
authenticating the authorized request generator as a valid BEU, wherein the authentication is based on the verification that the response provided for each question of the set of question, by the authorized request generator is matches with the plurality of actuals actions;
granting, based on the authentication, access to the valid BEU to proceed with the resource usage; and deducting the credit score of the valid BEU is deducted in accordance with a volume of the resource usage.

* * * * *